(12) United States Patent  (10) Patent No.: US 6,392,639 B1
Lee et al.  (45) Date of Patent: May 21, 2002

(54) PALM-SIZED COMPUTER WITH A STYLUS HOLDING ARRANGEMENT

(75) Inventors: Kwang-Youb Lee, Seoul; Jung-Woo Cha, Kyunggi-do, both of (KR)

(73) Assignee: SamSung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/281,796

(22) Filed: Mar. 31, 1999

(30) Foreign Application Priority Data

Mar. 31, 1998 (KR) .............................................. 98-11197

(51) Int. Cl.⁷ .............................................. G08C 21/00
(52) U.S. Cl. .................. 345/179; 178/19.01; 178/19.03
(58) Field of Search ................................ 345/179, 173; 178/19.01, 19.05, 18.01; 401/195, 361, 312

(56) References Cited

U.S. PATENT DOCUMENTS

| | | | | |
|---|---|---|---|---|
| 4,927,986 A | * | 5/1990 | Daly ............................ | 178/18 |
| 5,067,573 A | * | 11/1991 | Uchida ......................... | 178/18 |
| 5,180,891 A | | 1/1993 | Trumbo ........................ | 178/18 |
| 5,335,150 A | * | 8/1994 | Huang .......................... | 362/118 |
| 5,434,373 A | | 7/1995 | Komaki ........................ | 178/87 |
| 5,483,262 A | | 1/1996 | Izutani ......................... | 345/179 |
| 5,530,208 A | | 6/1996 | Moriconi et al. ............. | 178/18 |
| 5,555,157 A | * | 9/1996 | Moller et al. ................ | 361/683 |
| 5,635,959 A | | 6/1997 | Takeuchi et al. ............. | 345/179 |
| 5,703,626 A | | 12/1997 | Itoh et al. .................... | 345/173 |
| 5,747,748 A | | 5/1998 | Zigler .......................... | 178/18 |
| 5,750,939 A | | 5/1998 | Makinwae et al. ........... | 178/18 |
| 5,756,941 A | | 5/1998 | Snell ............................ | 178/18 |
| 5,757,681 A | * | 5/1998 | Suzuki et al. ................ | 364/705 |
| 5,865,552 A | * | 2/1999 | Manno ......................... | 401/195 |
| 6,014,552 A | * | 1/2000 | Aiken et al. .................. | 455/90 |

* cited by examiner

*Primary Examiner*—Amare Mengistu
*Assistant Examiner*—Nitin Patel
(74) *Attorney, Agent, or Firm*—Robert E. Bushnell, Esq.

(57) ABSTRACT

An arrangement for safely keeping a stylus as the input unit in the housing of a palm-sized computer contains a guide opening formed in one side of the housing, a stylus holding channel extending from the guide opening towards the inside of the housing for holding the stylus inserted through the guide opening, the cross section of the stylus holding channel being designed to snugly receive the stylus, at least a groove formed on the circumference of the stylus, a resilient strip formed integrally with the inside of the stylus holding channel by cutting the wall of the stylus holding channel, the resilient strip elongated in the direction of the stylus holding channel and having a free end, and a hook projected from the free end of the resilient strip towards the inside of the stylus holding channel, wherein the hook may engage the groove to safely keep the stylus inserted into the stylus holding channel. Preferably, the stylus has more than one grooves so as to be inserted into the stylus holding channel step by step. The arrangement further includes a flange radially formed on the rear end of the stylus, and a slot formed in one side of the housing adjacent to the guide opening as to engage and expose the flange of the stylus completely inserted into the stylus holding channel, whereby the flange may be manually pressed upon retracting the stylus out of the stylus holding channel. The hook contains a radius of curvature the same as that of a groove of a stylus allowing for surfaces, instead of points, to meet when the hook locks into a groove of a stylus.

19 Claims, 15 Drawing Sheets

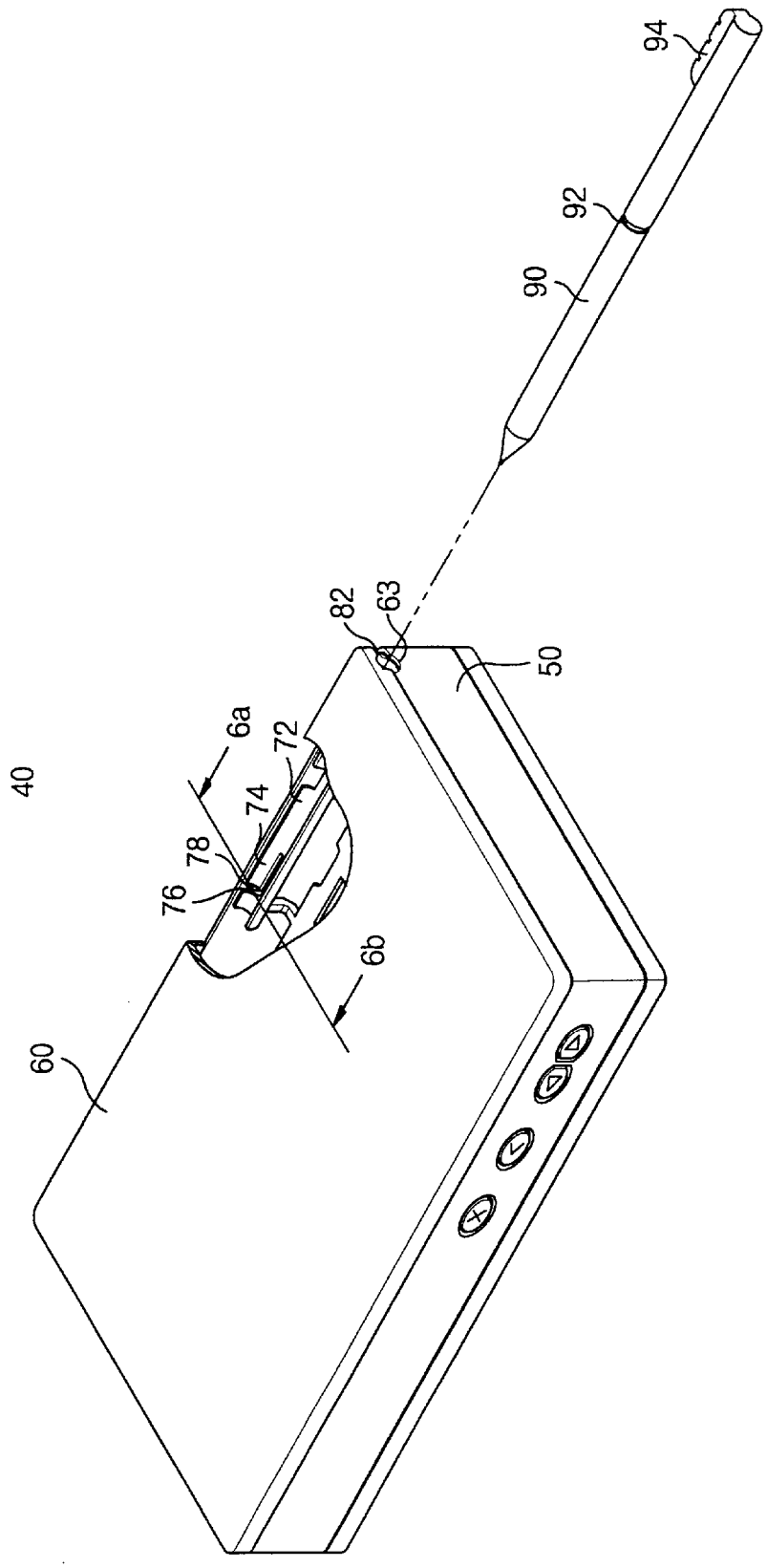

PALM-SIZED COMPUTER WITH A STYLUS HOLDING ARRANGEMENT

CLAIM OF PRIORITY

This application makes reference to, incorporates the same herein, and claims all benefits accruing under 35 U.S.C. § 119 from an application for PALM-SIZED COMPUTER WITH A STYLUS HOLDING ARRANGEMENT earlier filed in the Korean Industrial Property Office on the Mar. 31, 1998 and there duly assigned Ser. No. 11197/1998.

FIELD OF THE INVENTION

The present invention concerns a palm-sized computer, and more particularly an arrangement for keeping a stylus as an input means in a palm-sized computer.

BACKGROUND OF THE INVENTION

Personal computers are classified on the basis of size and portability. Personal computers that can be placed on top of a desk but are not very portable are called desktop computers. Portable computers are those personal computers that are light enough to be easily transported. Portable personal computers that are small enough to be set on the lap of a user are called laptop computers; notebook computers are approximately the size of a book. Portable personal computers that can be put in a pocket are called pocket or palm-sized computers.

A notebook computer typically has a keyboard as its input unit, but a pocket or palm-sized computer usually employs a stylus as its input unit in stead of a keyboard because the stylus enhances the portability and facilitates data input. The data input is made by pointing to different spots on a screen with the stylus. Such a stylus-input computer is also called a pen-input computer. In such a palm-sized computer using a stylus as the input unit, it is necessary to keep the stylus in the body of the computer when it is not used.

U.S. Pat. No. 5,434,373 for a Pen Receptacle For Detachably Receiving A Pen to Komaki discloses one such arrangement. In Komaki '373, a pen or stylus has an annular groove and the housing has a hook disposed on the end of a resilient strip for locking into the groove of the pen when the pen is inserted. However, only one groove is shown on the pen and the hook is shaped such that it touches the groove of the stylus at a single point as opposed to a finite surface. Such an arrangement is not as secure and user friendly as an arrangement where there are many grooves on the pen and the hook contacts the stylus groove at a range of points or a finite surface.

SUMMARY OF THE INVENTION

It is an object of the present invention to provide a hooking mechanism of a palm sized computer that makes contact with a surface of a groove of a stylus, securing the stylus inside the palm-sized computer.

It is also an object to provide a plurality of grooves on the stylus for inserting the stylus into the housing of the palm-sized computer at several stages.

It is yet another object of the invention to provided a flange on the end of the stylus that fits into a slot in the housing whereby the flange may be manually pressed upon retracting the stylus out of the stylus holding channel.

According to an embodiment of the present invention, an arrangement for safely keeping a stylus as the input unit in the housing of a palm-sized computer comprises a guide opening formed in one side of the housing, a stylus holding channel extending from the guide opening towards the inside of the housing for holding the stylus inserted through the guide opening, the cross section of the stylus holding channel being designed to snugly receive the stylus, at least a groove formed on the circumference of the stylus, a resilient strip formed integrally with the inside of the stylus holding channel by cutting the wall of the stylus holding channel, the resilient strip elongated in the direction of the stylus holding channel and having a free end, and a hook projected from the free end of the resilient strip towards the inside of the stylus holding channel, wherein the hook may engage the groove to safely keep the stylus inserted into the stylus holding channel. Preferably, the stylus has more than one grooves so as to be inserted into the stylus holding channel step by step. The hook that engages the groove of the stylus has a radius of curvature about equal to that of the groove of the stylus, allowing for the surfaces of the stylus groove and the hook to come into contact. The arrangement further includes a flange radially formed on the rear end of the stylus, and a slot formed in one side of the housing adjacent to the guide opening so as to engage and expose the flange of the stylus completely inserted into the stylus holding channel, whereby the flange may be manually pressed upon retracting the stylus out of the stylus holding channel.

According to another embodiment of the present invention, an arrangement for safely keeping the stylus as the input unit in the housing of a palm-sized computer comprises a top housing part having an upper surface, side surfaces and a lower opening, a bottom housing part for covering the lower opening, a frame mounted in the housing consisting of the upper and bottom housing parts, a first notch formed in one side of the top housing part having a cross section shaped like a part of the circumference of the stylus, a second notch formed in one side of the bottom housing part so as to form with the first notch a guide opening for snugly guiding the stylus when the top and bottom housing parts are connected, a stylus holding channel extending from the guide opening towards the inside of the housing for holding the stylus inserted through the guide opening, the cross section of the stylus holding channel being designed to snugly receive the stylus, at least a groove formed on the circumference of the stylus, a resilient strip formed integrally with the inside of the stylus holding channel by cutting the wall of the stylus holding channel, the resilient strip elongated in the direction of the stylus holding channel and having a free end, and a hook projected from the free end of the resilient strip towards the inside of the stylus holding channel, wherein the hook may engage the groove to safely keep the stylus inserted into the stylus holding channel. Preferably, the bottom housing part includes at least a first rib extended from the second notch along the length of the stylus holding channel to support the stylus against the stylus holding channel upon connecting the top and bottom housing parts, and a second rib extended from the first rib and having a cross section shaped like a part of the circumference of the stylus. Further, the arrangement includes a flange radially formed on the rear end of the stylus, and a slot formed in one side of the housing adjacent to the guide opening so as to engage and expose the flange of the stylus completely inserted into the stylus holding channel, whereby the flange may be manually pressed upon retracting the stylus out of the stylus holding channel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIG. 5A is a partly cut perspective view for illustrating the housing of a palm-sized computer consisting of the bottom housing part of FIG. 4 attached to the upper housing part;

DETAILED DESCRIPTION OF THE INVENTION

Figure 1:
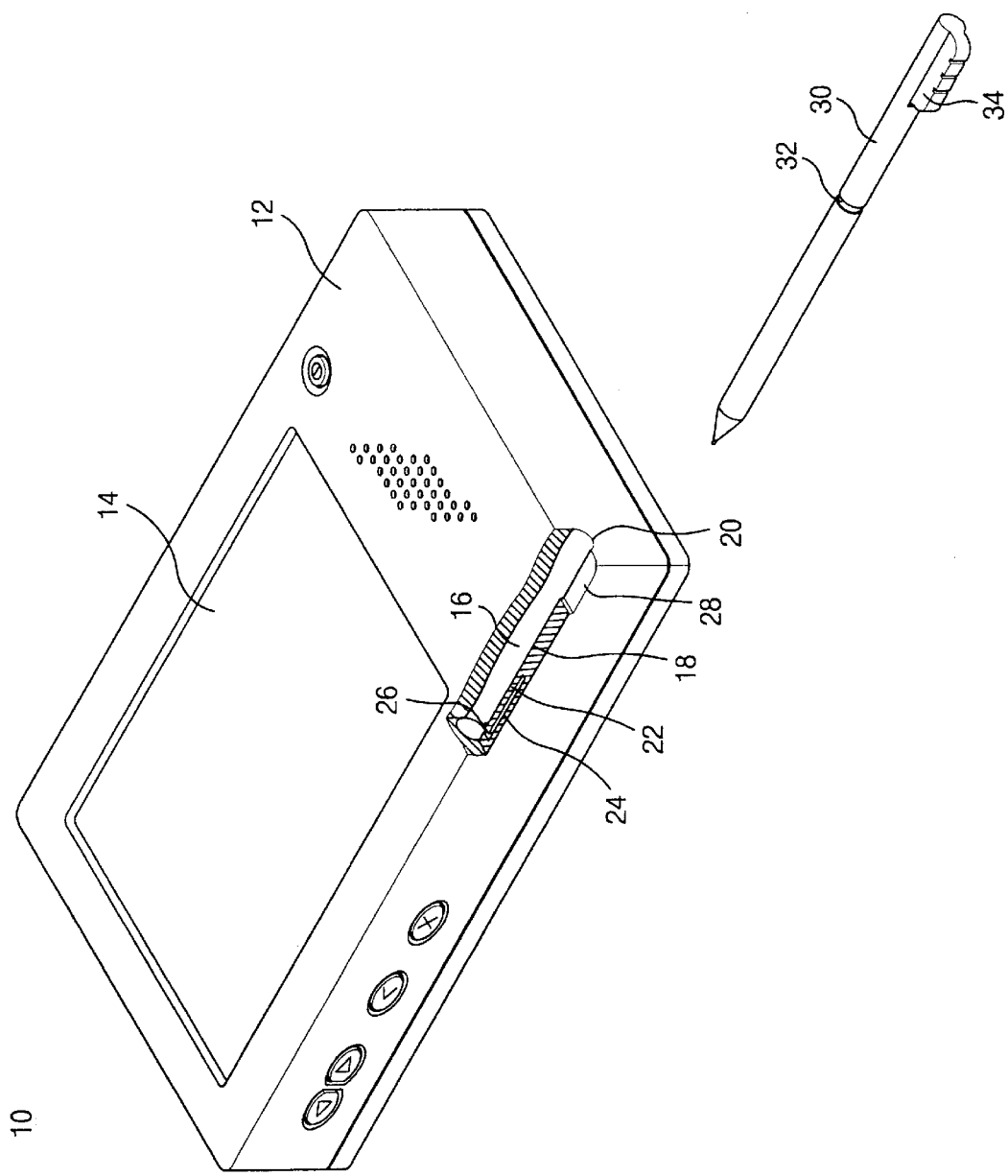
FIG. 1 is a perspective view with a part sectioned for illustrating the housing of a palm-sized computer according to an embodiment of the present invention.
Figure 2A:
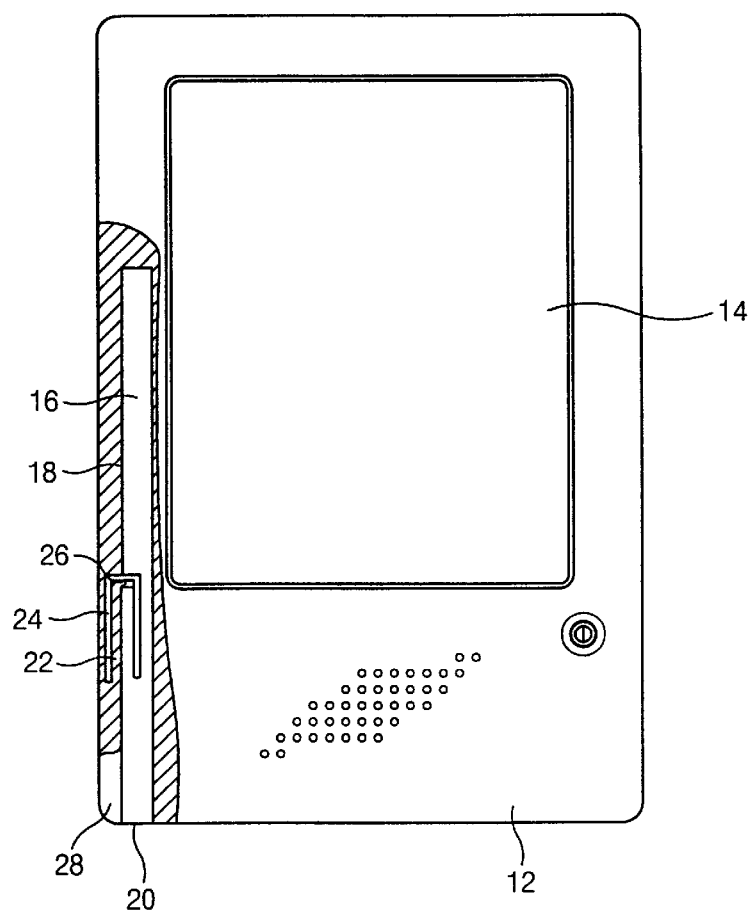
FIG. 2A is a plane view with a part cut for illustrating a palm-sized computer with a stylus not held in the arrangement for keeping the stylus.
Figure 2A:
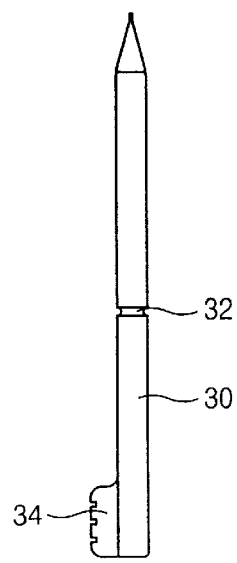
Figure 2B:
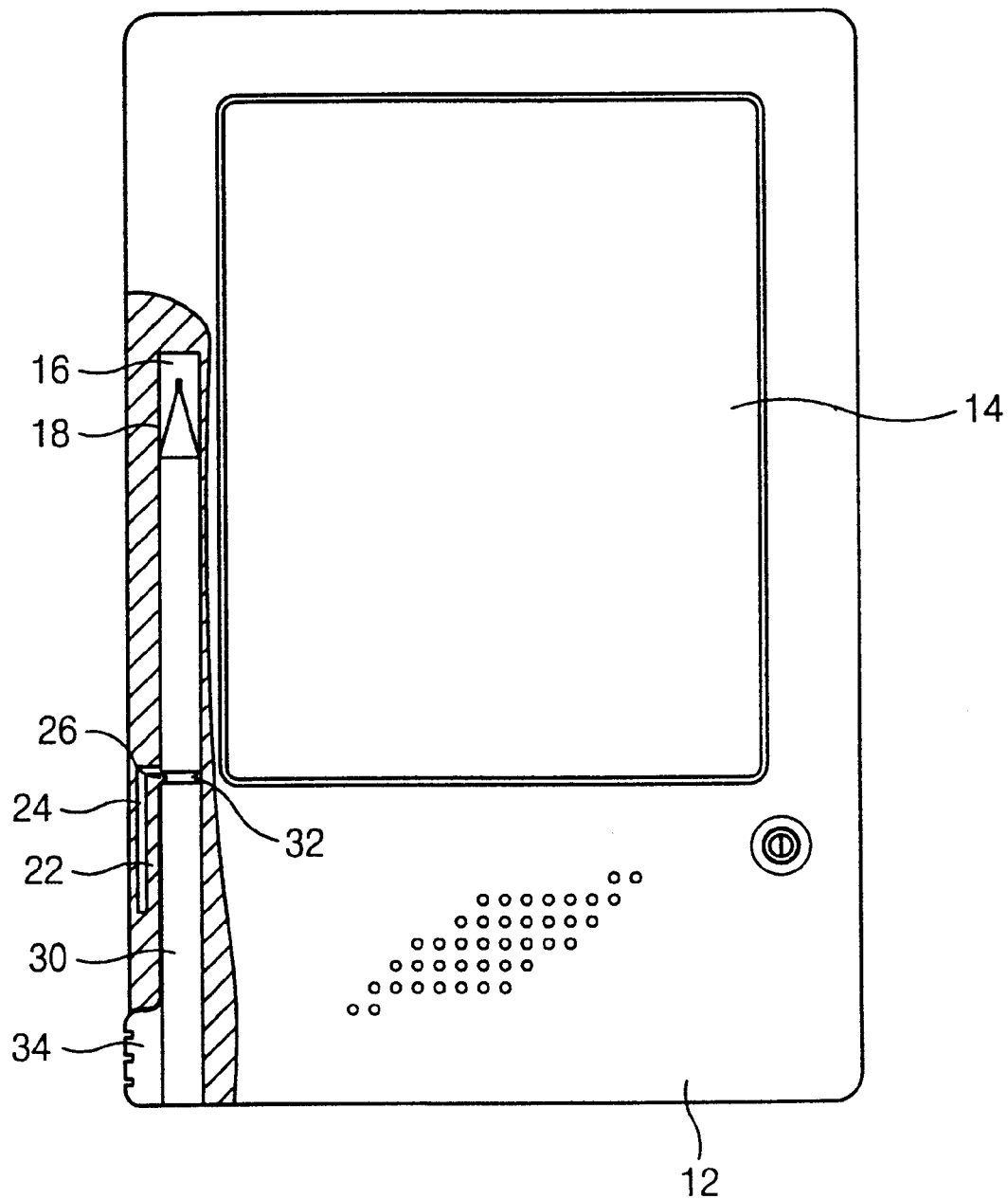
FIG. 2B is a view similar to FIG. 2A but with the stylus held in the arrangement for keeping the stylus.
Figure 3:
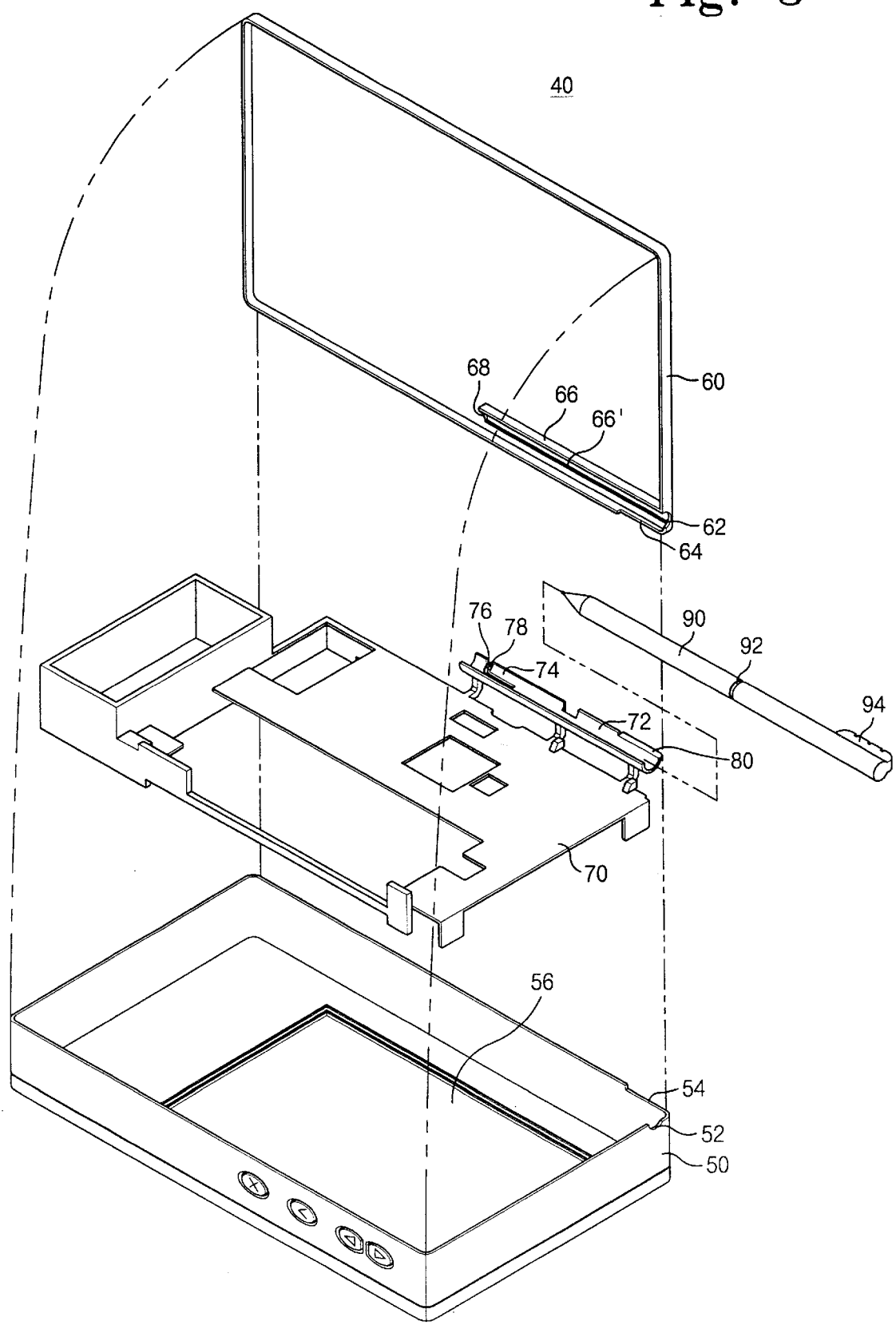
FIG. 3 is an exploded view of the housing of a palm-sized computer according to another embodiment of the present invention.
Figure 4:
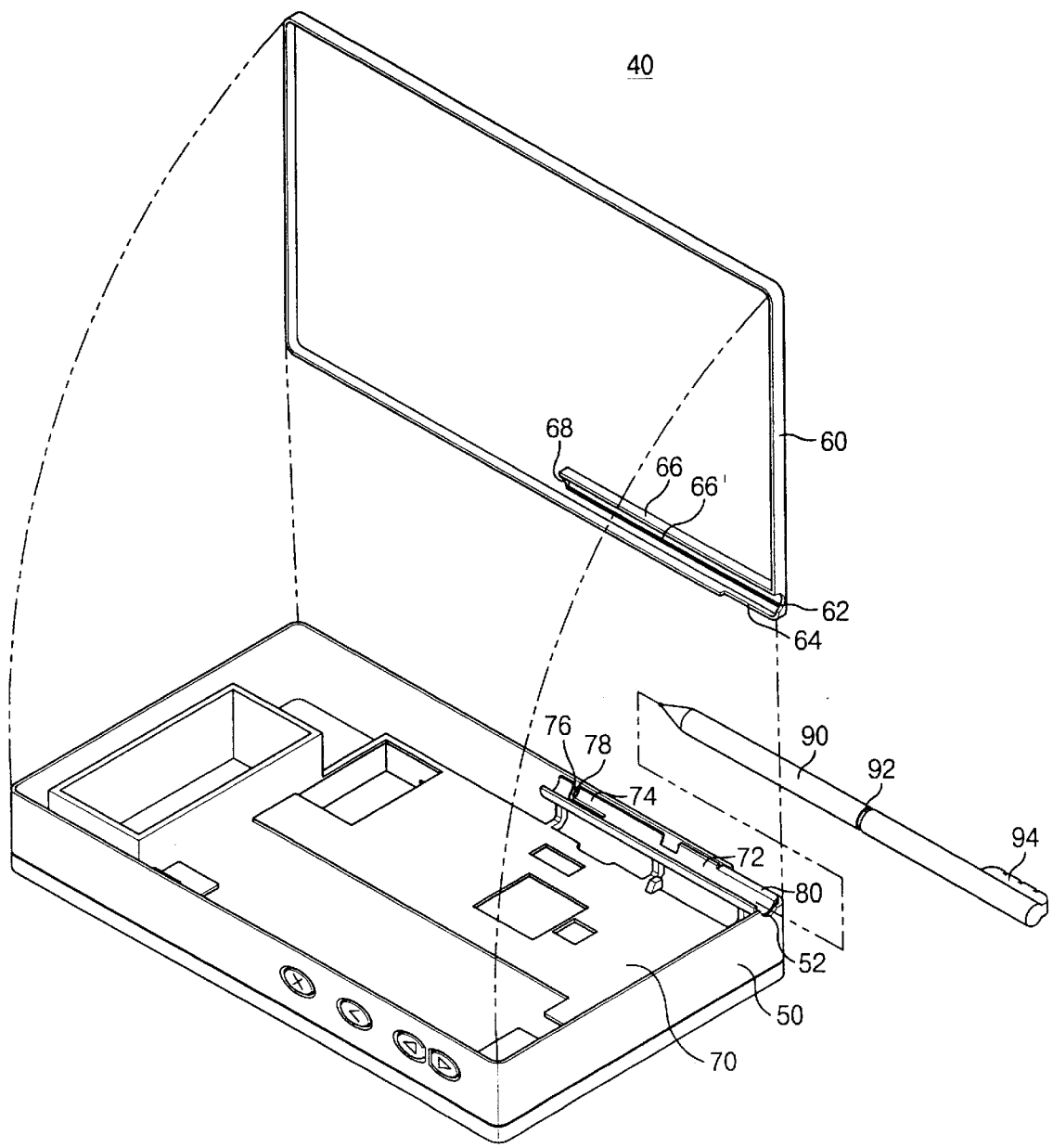
FIG. 4 is a view similar to FIG. 3 but with the frame mounted in the top housing part.

Throughout the attached drawings are used same reference numerals to represent corresponding parts. Referring to FIGS. 1 to 2B, a palm-sized computer 10 has a housing 12, stylus 30 and a screen 14. Installed in the housing 12 are various electronic devices and power supply connected with the screen 14. The data input is made by pointing to different spots on the screen 14 with the stylus 30. The stylus may interact with the screen of the computer via a conductive cord or cordless means called touch screen technology. In the present embodiment, the cordless means is employed.

The housing 12 has a stylus holding channel 16 for receiving the stylus 30. A guide opening 20 is formed in one side of the housing 12. The stylus holding channel 16 extends from the guide opening towards the inside of the housing. The cross section of the stylus holding channel is designed to snugly receive the stylus 30. A resilient strip 22 is formed integrally with the inside 18 of the stylus holding channel 16 by cutting the wall of the stylus holding channel. The resilient strip 22 is elongated in the direction of the stylus holding channel 16, having a free end. A hook 26 is projected from the free end of the resilient strip 22 towards the inside of the stylus holding channel 16. The free end of the resilient strip 22 is designed to resiliently contact the stylus inserted in the stylus holding channel 16. At least a groove 32 is formed on the circumference of the stylus 30. The hook 26 engages the groove 32 to safely keep the stylus 30 inserted into the stylus holding channel 16. The arrangement further includes a flange 34 radially formed on the rear end of the stylus 30, and a slot 28 formed in one side of the housing adjacent to the guide opening 20 so as to engage and expose the flange 34 of the stylus 30 completely inserted into the stylus holding channel 16. Thus, the flange 34 and slot 28 cooperate to facilitate the insertion or retraction of the stylus 30 into or from the stylus holding channel 16. The slot 28 has substantially the same length as the flange 34.

Inserting the stylus 30 into the stylus holding channel 16 through the guide opening 20, the hook 26 formed on the free end of the resilient strip 22 is pressed outwards by the circumference of the stylus 30. When the stylus 30 is completely inserted into the stylus holding channel 16 with the flange 34 engaging the slot 28, the hook 26 is locked by the groove 32 on the stylus 30. On the contrary, the retraction of the stylus 30 from the stylus holding channel 16 is achieved by pressing and pushing the flange 34 outwards. Namely, the flange may be manually pressed upon retracting the stylus out of the stylus holding channel.

Describing the arrangement for keeping the stylus in the housing of a palm-sized computer in reference to FIGS. 3 to 5A, there are shown a top housing part 50, bottom housing part 60, frame 70, and stylus 90. The top housing part 50 has an upper surface, side surfaces and a lower opening. The bottom housing part 60 is to cover the lower opening of the top housing part 50. A frame 70 is mounted in the housing consisting of the upper and bottom housing parts. Mounted on the frame 70 are various electronic devices, power supply and screen required to operate the computer. A first notch 52 is formed in one side of the top housing part 50 having a cross section shaped like a part of the circumference of the stylus, and a second notch 62 in the corresponding side of the bottom housing part 60 so as to form with the first notch 52 a guide opening 63 (see FIG. 5A) for snugly guiding the stylus 90 when the top and bottom housing parts 50 and 60 are connected. A stylus holding channel is extended from the guide opening 63 towards the inside of the housing for holding the stylus inserted through the guide opening. The cross section of the stylus holding channel is designed to snugly receive the stylus. The stylus holding channel may be formed in the bottom housing part 60 and frame 70. Of course, it may be formed only in the frame 70, or both in the frame 70 and top housing part 50, as desired. In the present embodiment, the stylus holding channel consists of a channel part 72 formed in the frame 70 and a plurality of ribs 66, 66' and 68 formed in the bottom housing part 60. The cross section of the channel part 72 is shaped like a part of the circumference of the stylus 30. The length of the channel part 72 is designed to fit that of the stylus 30. A resilient strip 74 is formed integrally with the inside of the channel part 72 by cutting its wall along a cut line 76. The resilient strip 74 is elongated in the direction of the stylus holding channel and having a free end. A hook 78 is projected from the free end of the resilient strip 74 towards the inside of the stylus holding channel. The free end is designed to resiliently contact the circumference of the stylus inserted in the stylus holding channel. The hook 78 may engage a groove 92 formed on the circumference of the stylus 90 to safely keep the stylus inserted into the stylus holding channel.

Figure 5B:
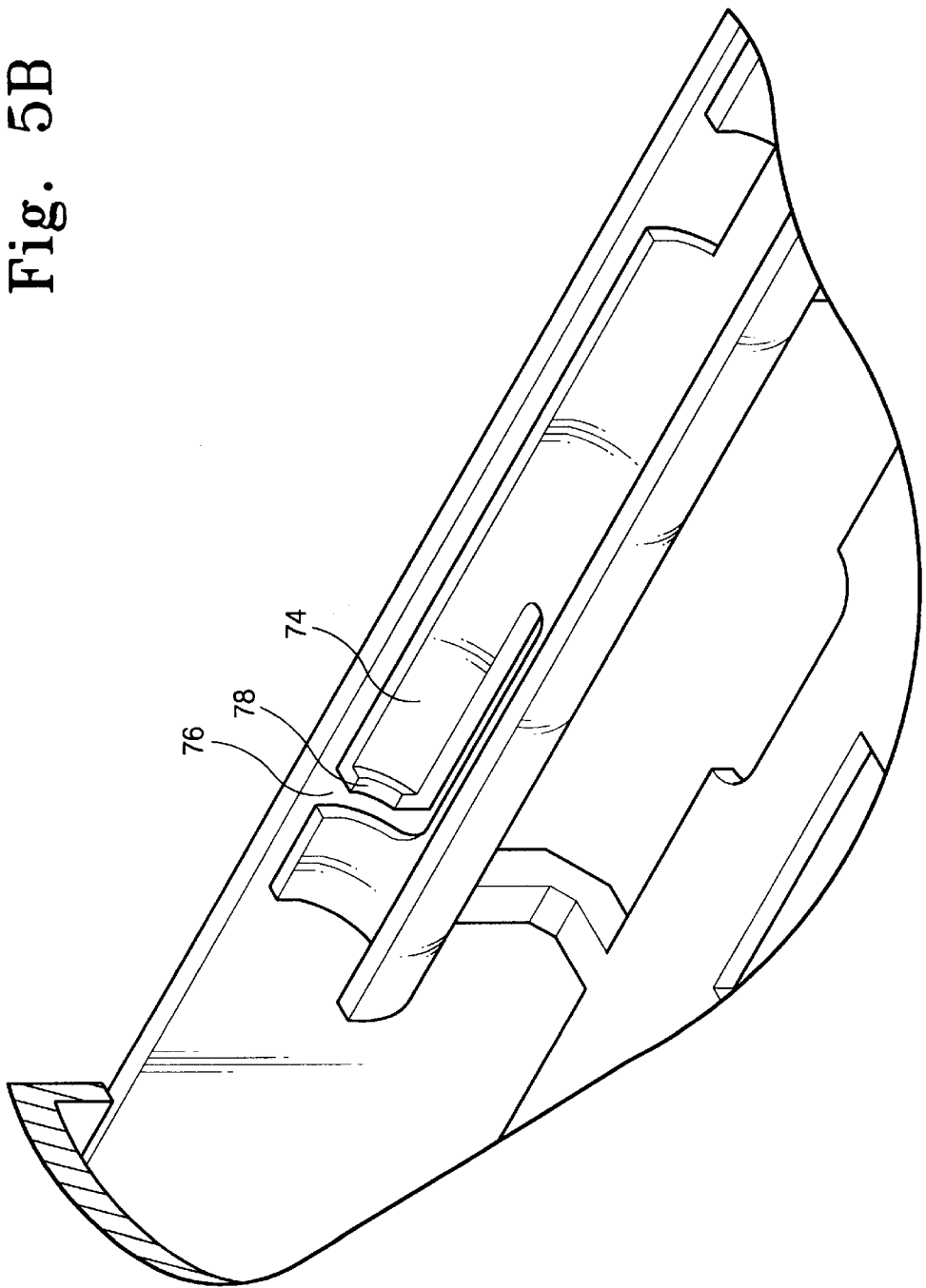
FIG. 5B is an expanded view of the hook and resilient strip of FIG. 5A showing the curvature of the hook.
Figure 5C:
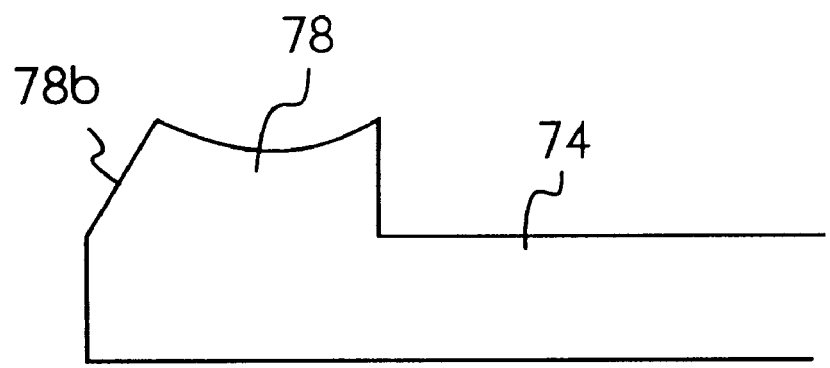
FIG. 5C is a close up view of the hook showing the distal end being rounded or beveled for user retraction and removal.

FIG. 5B shows an expanded view of resilient strip 74, hook 78, and cut line 76. As can be seen from FIG. 5B, hook 78 is curved with the same curvature as the annular groove 92 about stylus 90. This is so hook 78 contacts annular groove 92 over a surface rather than just at a single point. The distal side of hook 78 is given reference numeral 78b. The distal side of hook 78b is beveled or rounded as shown in FIGS. 5C allowing a user to easily remove stylus 90 from the palm-sized computer 40. During this removal, distal side of hook 78b cams with the edge of groove 92 of stylus 90 allowing the stylus 90 to slide out, with user force, from palm-sized computer 40.

Figure 5D:
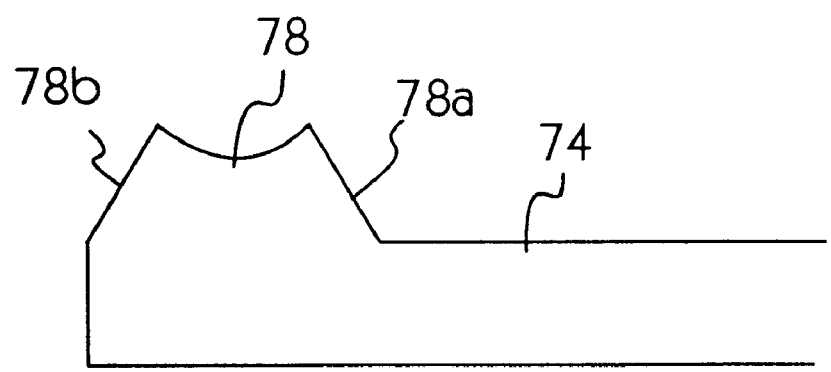
FIG. 5D is a close up view of the hook showing both the distal end and the proximal end rounded or beveled to allow for insertion and removal in the case the stylus has more than one groove.

FIG. 5D shows hook 78 in another embodiment of this invention when there is more than one groove on the stylus. In such a scenario, both the distal end 78b and the proximal end 78a must be beveled or rounded to allow for camming action during insertion and removal of stylus 90 to and from palm-sized computer 40.

Figure 6A:
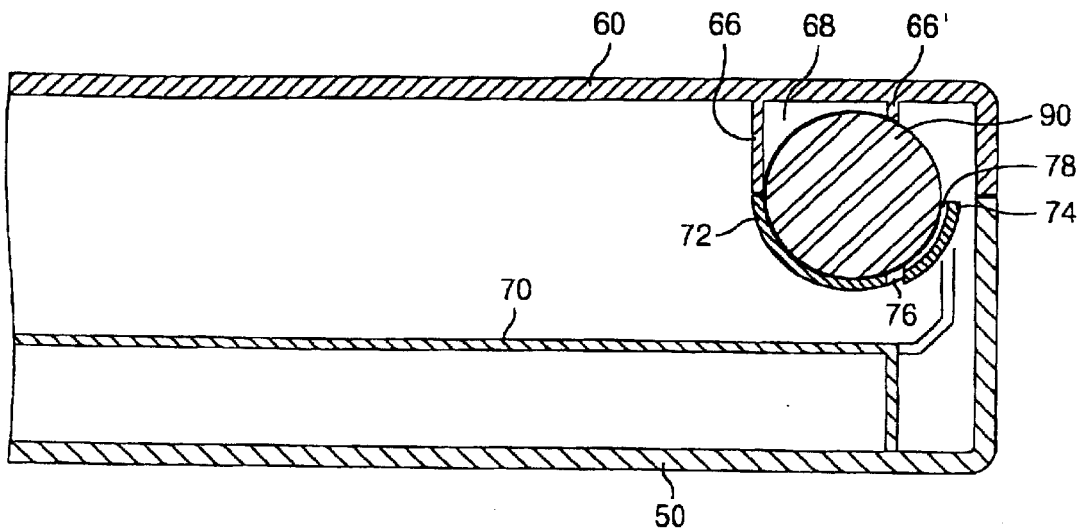
FIG. 6A is a cross sectional view taken along line 6a–6b of FIG. 5 before the hook engages the groove on the stylus inserted into the stylus holding channel.
Figure 6B:
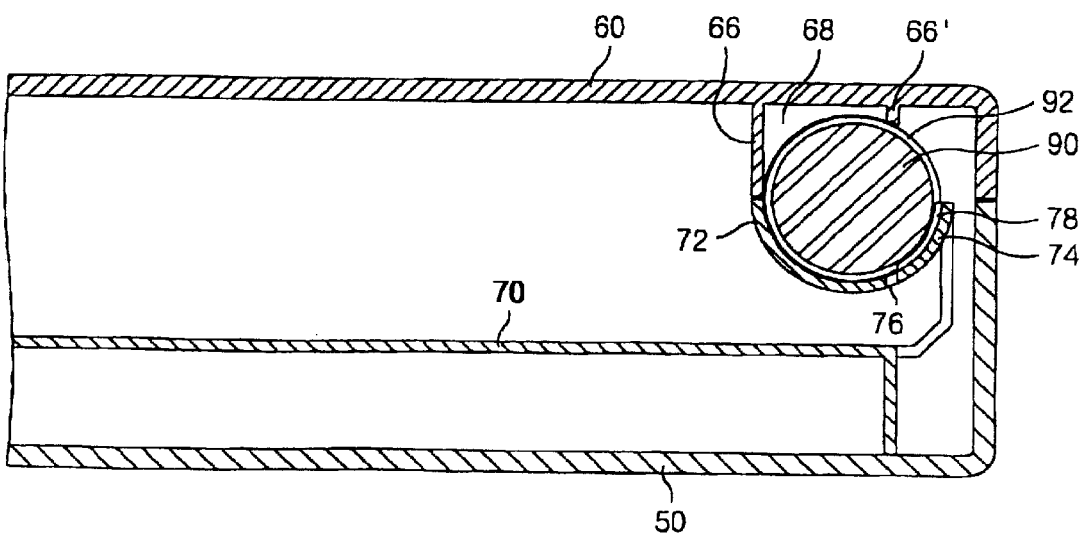
FIG. 6B is a view similar to FIG. 6A but with the hook engaging the groove on the stylus.

Meanwhile, the bottom housing part 60 includes at least first rib 66, 66' extended from the second notch 62 along the length of the channel part 72 to support the stylus 90 against the channel part upon connecting the top and bottom housing parts, and a second rib 68 extended from the first rib 66, 66'. The second rib 68 has a cross section shaped like a part of the circumference of the stylus 90 to partly embrace the circumference of the stylus 90, as shown in FIGS. 6A and 6B. Preferably, a flange 94 is radially formed on the rear end of the stylus 90, and a slot 82 in one side of the housing adjacent to the guide opening 63 so as to engage and expose the flange 94 of the stylus 90 completely inserted into the stylus holding channel. The slot 82 consists of a first cut 54 formed in the top housing 50, a second cut 64 formed in the bottom housing 60, and a third cut 80 formed in the frame 70. Namely, the first, second and third cuts 54, 64 and 80 complete the slot 82, as shown in FIG. 5, when the top and bottom housing parts 50 and 60 and the frame 70 are assembled together. Thus, the flange 94 may be manually pressed upon retracting the stylus 90 out of the stylus holding channel.

Referring to FIGS. 6A and 6B, inserting the stylus 90 into the stylus holding channel, it is supported by the channel part 72 and first and second ribs 66, 66' and 68. In this case, the hook 78 is pushed outwards by the circumference of the stylus 90 before the stylus 90 has been completely inserted into the stylus holding channel, as shown in FIG. 6A. Completing the insertion of the stylus 90, the hook 78 is locked by the groove 92 on the stylus 90, thus safely keeping the stylus in the housing.

Figure 6C:
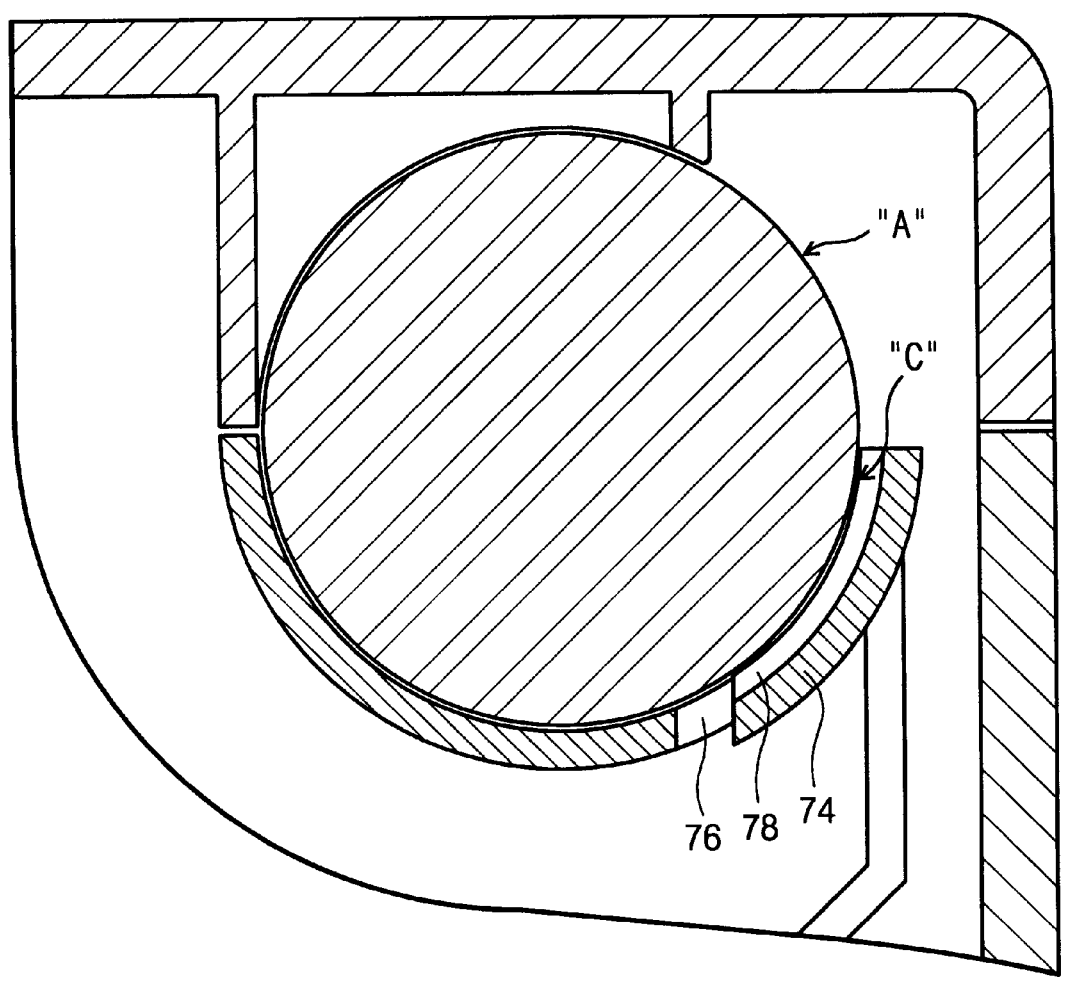
FIG. 6C is a view similar to FIG. 6A showing at close up range how the resilient strip and the hook interact with the stylus prior to locking the stylus into place.
Figure 6D:
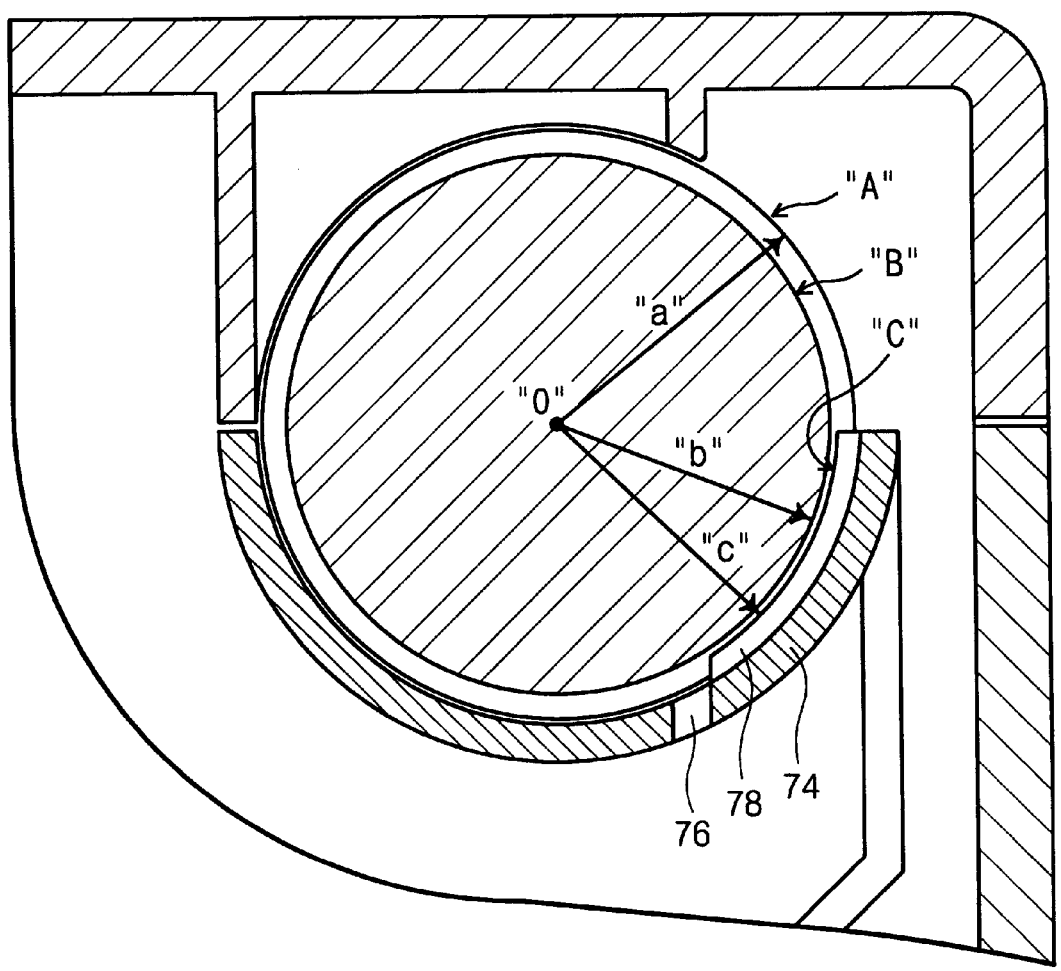
FIG. 6D is a view similar to FIG. 6B showing at close up range how the resilient strip and the hook interact with the groove of the stylus upon locking the stylus into palm-sized computer.

Referring to FIGS. 6C and 6D, the cross-section of stylus 90 forms a circle of radius A about the central axis of the stylus. If the cross-section of stylus 90 is taken at groove 92, the radius is B which is smaller than A. Meanwhile, hook 78 as previously described has a curvature. The curvature of hook 78 about the center of stylus 90 is C which is about equal to the curvature B of the groove 92. As shown in FIG. 6C, when hook 78 is in contact with stylus 90 at a location other than groove 92, resilient strip 74 is flexed to accommodate the larger radius of A. However, when hook 78 is in contact with groove 92 of stylus 90, resilient strip 74 flexes back and hook 78 having curvature c mates with the surface of groove 92 having curvature B. In FIG. 6D, stylus 90 is locked into palm-sized computer 40.

Figure 7:
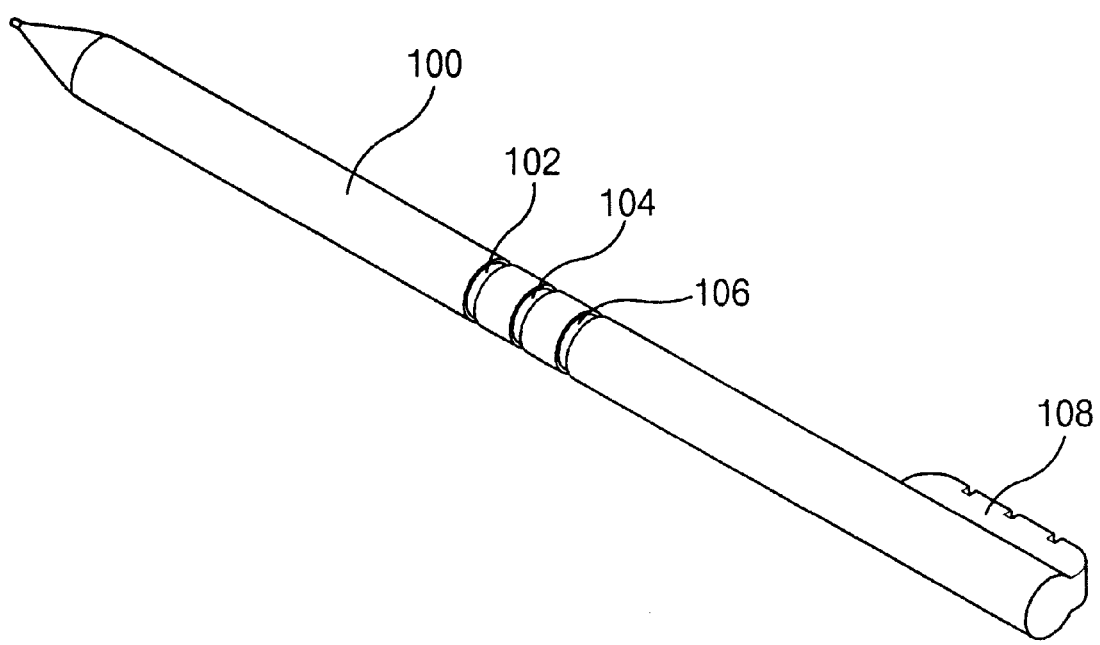
FIG. 7 is a perspective view of a stylus according to another embodiment of the present invention.
Figure 8A:
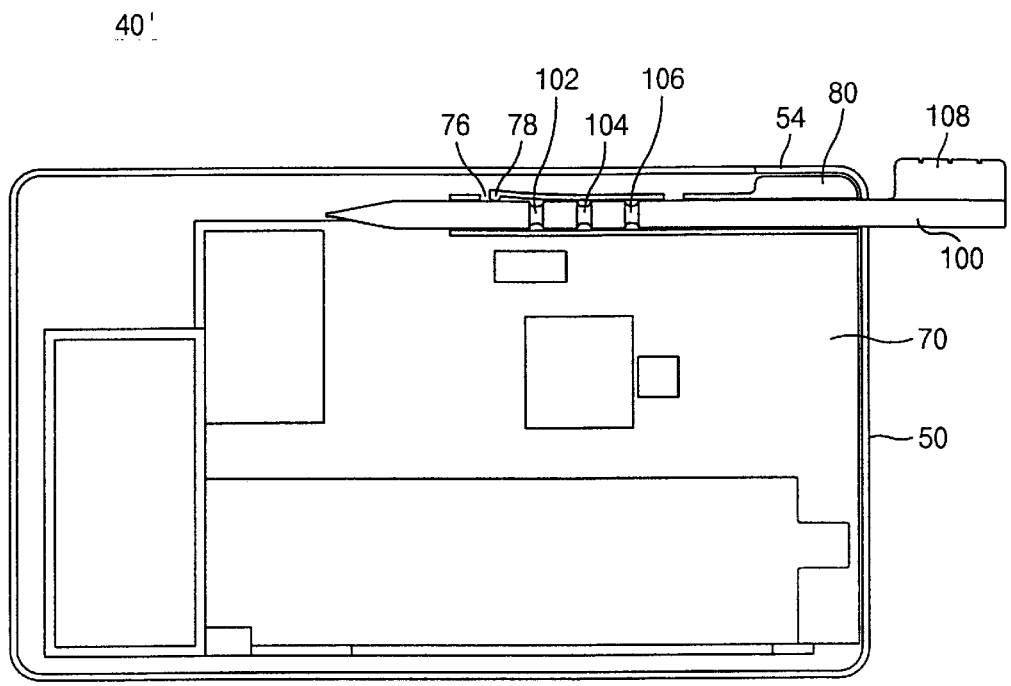
FIGS. 8A to 8D are plane views of the housing of a palm-sized computer with the bottom housing detached for illustrating the steps of the stylus of FIG. 7 being inserted into the stylus holding channel.
Figure 8B:
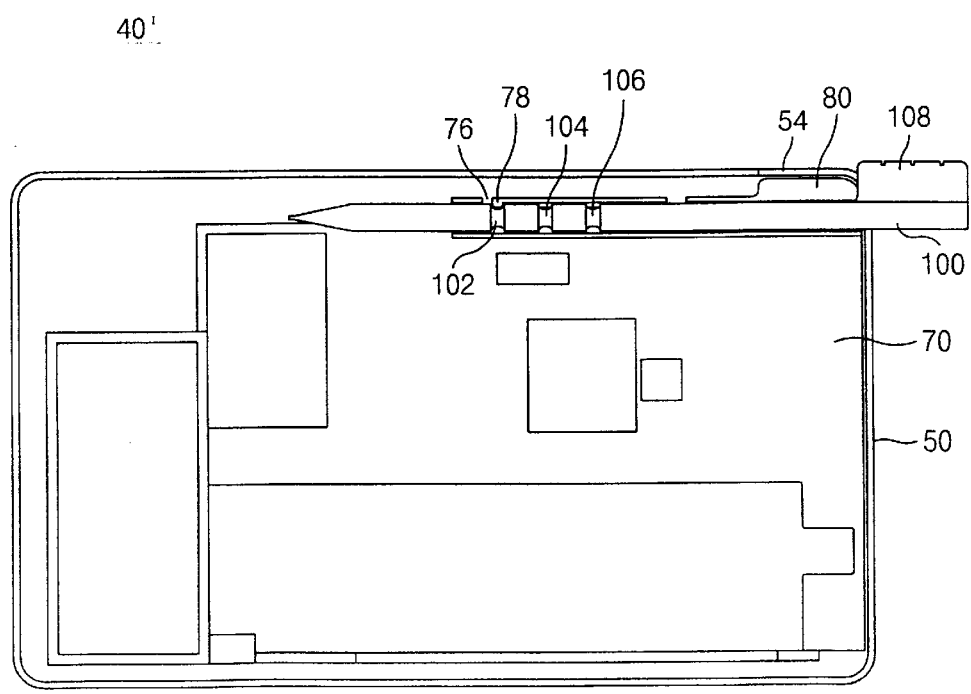
Figure 8C:
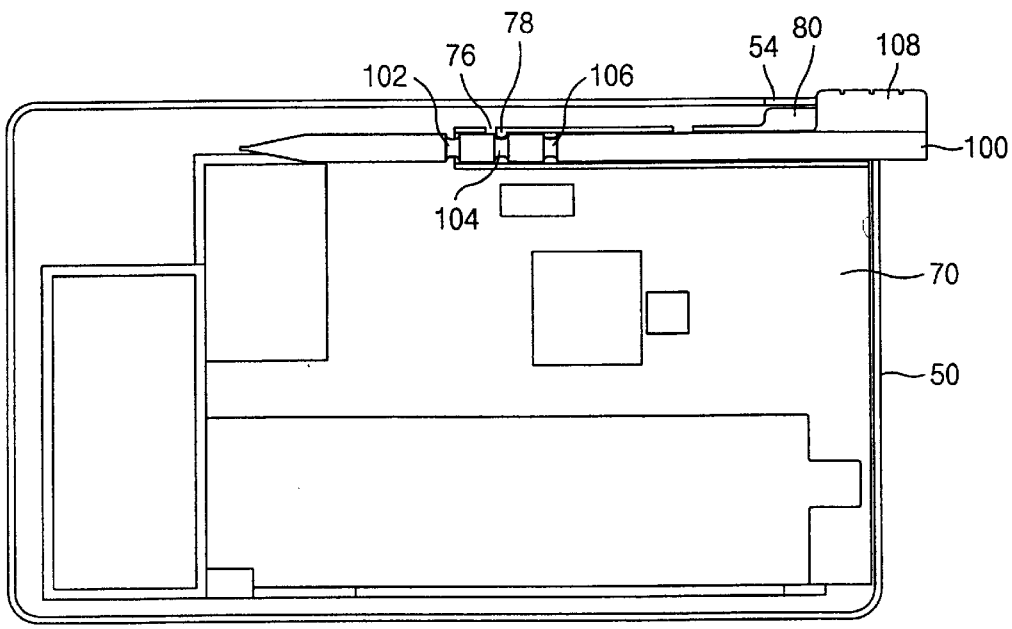
Figure 8D:
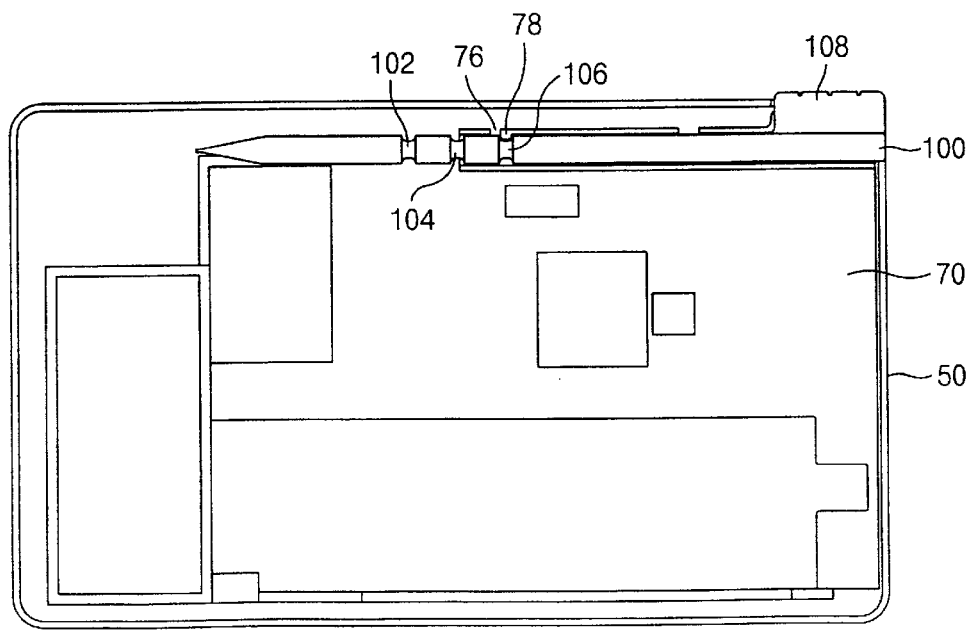
Figure 9:
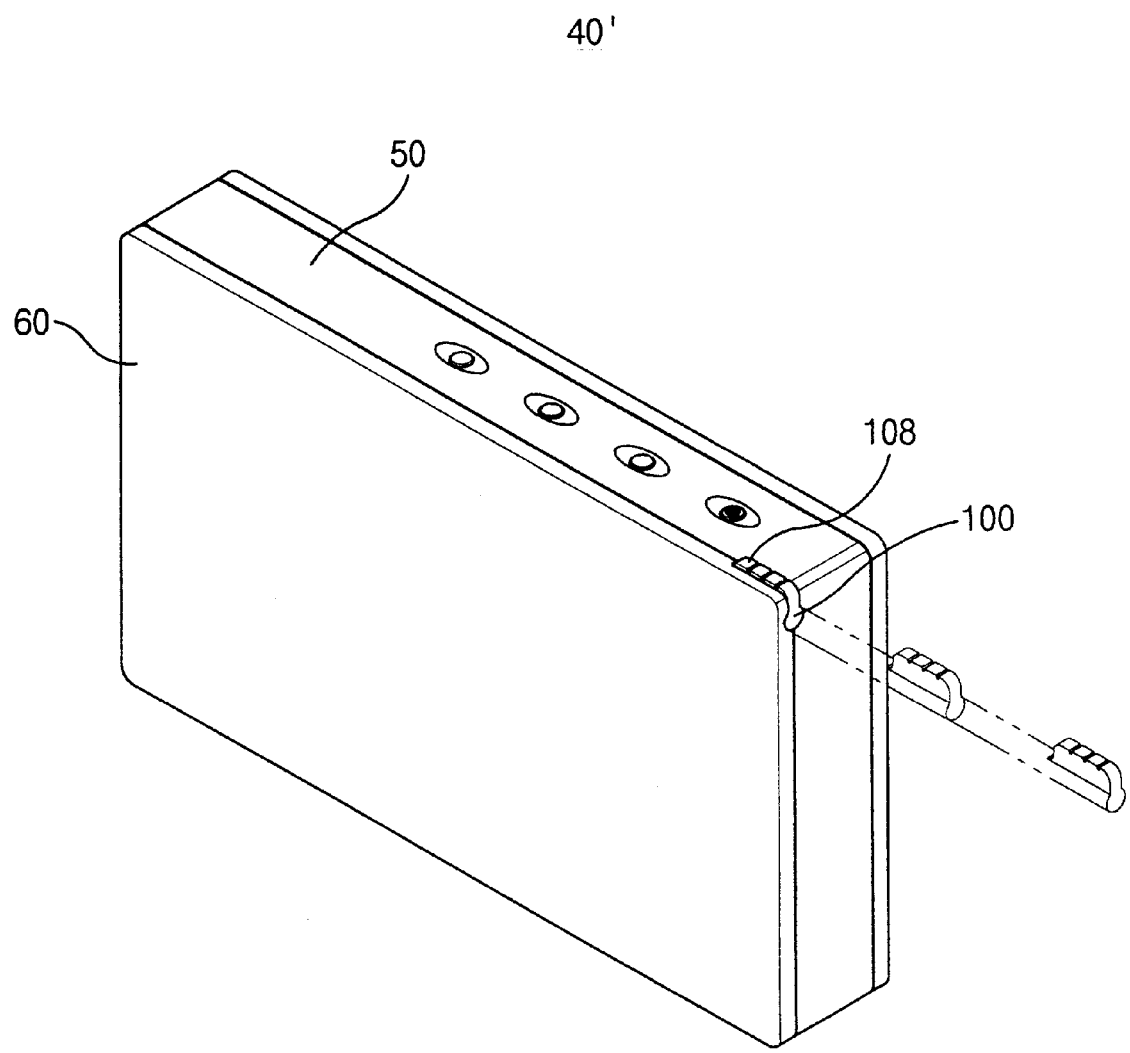
FIG. 9 is a perspective view of a palm-sized computer for illustrating the stylus being externally inserted into the housing.

Alternatively, as shown in FIGS. 7 to 9, the stylus 100 may have more than one grooves so as to be inserted into the stylus holding channel step by step. For example, the stylus 100 is provided with a first groove 102, second groove 104 and third groove 106, as show in FIG. 7. These grooves 102, 104, 106 cause the stylus 100 to be inserted into the stylus holding channel of a palm-sized computer 40' step by step, as shown in FIGS. 8A to 8B. Of course, the stylus 100 is retracted from the stylus holding channel step by step. Thus, these grooves 102, 104, 106 enables the user to safely keep the stylus 100 partly retracted from the housing, thus facilitating retraction of it for use.

While the present invention has been described in connection with specific embodiments accompanied by the attached drawings, it will be readily appreciated by those skilled in the art that various changes and modifications may be made thereto without departing the gist of the present invention.

What is claimed is:

1. In a palm-sized computer employing a stylus as the input unit, an arrangement for safely keeping said stylus in the housing of said computer comprising:

a guide opening formed in one side of said housing;

a stylus holding channel extending from said guide opening towards the inside of said housing for holding said stylus inserted through said guide opening, the cross section of said stylus holding channel being designed to snugly receive said stylus;

at least a groove formed on the circumference of said stylus, said groove having a first radius of curvature;

a resilient strip formed integrally with the inside of said stylus holding channel by cutting the wall of said stylus holding channel, said resilient strip elongated in the direction of said stylus holding channel and having a free end; and a hook projected from said free end of said resilient strip towards the inside of said stylus holding channel, said hook having a first radius of curvature, wherein said hook may engage said groove, mating with said groove over a surface of said groove to safely keep the stylus inserted into said stylus holding channel.

2. An arrangement for safely keeping said stylus as defined in claim 1, wherein said stylus has more than one groove so as to be inserted into said stylus holding channel step by step.

3. An arrangement for safely keeping said stylus as defined in claim 1, further including a flange radially formed on the rear end of said stylus, and a slot formed in one side of said housing adjacent to said guide opening so as to engage and expose said flange of said stylus completely inserted into said stylus holding channel, whereby said flange may be manually pressed upon retracting said stylus out of said stylus holding channel.

4. The arrangement for safely keeping said stylus as defined in claim 1, wherein the radius of curvature of said stylus is greater than the radius of curvature of said hook.

5. The arrangement for safely keeping said stylus as defined in claim 1, wherein a distal end and a proximal end of said hook are rounded or beveled so as to allow for camming action as said stylus is inserted into or removed from said palm-sized computer.

6. The arrangement for safely keeping said stylus as defined in claim 1, wherein said resilient strip having said hook flexes to allow for the insertion and removal of said stylus from said palm-sized computer when said hook is not in contact with one of said grooves on said stylus.

7. In a palm-sized computer employing a stylus as the input unit, an arrangement for safely keeping said stylus in the housing of said computer comprising:
   a top housing part having an upper surface, side surfaces and a lower opening;
   a bottom housing part for covering said lower opening;
   a frame mounted in said housing consisting of said upper and bottom housing parts;
   a first notch formed in one side of said top housing part having a cross section shaped like a part of the circumference of said stylus;
   a second notch formed in one side of said bottom housing part so as to form with said first notch a guide opening for snugly guiding said stylus when said top and bottom housing parts are connected;
   a stylus holding channel extending from said guide opening towards the inside of said housing for holding said stylus inserted through said guide opening, the cross section of said stylus holding channel being designed to snugly receive said stylus;
   at least a groove formed on the circumference of said stylus, each of said grooves having a first radius of curvature;
   a resilient strip formed integrally with the inside of said stylus holding channel by cutting the wall of said stylus holding channel, said resilient strip elongated in the direction of said stylus holding channel and having a free end; and
   a hook projected from said free end of said resilient strip towards the inside of said stylus holding channel, said hook having a first radius of curvature, wherein said hook may engage one of said grooves, mating with said groove over a surface of said groove to safely keep the stylus inserted into said stylus holding channel.

8. An arrangement for safely keeping said stylus as defined in claim 7, wherein said bottom housing part includes:
   at least a first rib extended from said second notch along the length of said stylus holding channel to support said stylus against said stylus holding channel upon connecting said top and bottom housing parts; and
   a second rib extended from said first rib and having a cross section shaped like a part of the circumference of said stylus.

9. An arrangement for safely keeping said stylus as defined in claim 7, further including a flange radially formed on the rear end of said stylus, and a slot formed in one side of said housing adjacent to said guide opening so as to engage and expose said flange of said stylus completely inserted into said stylus holding channel, whereby said flange may be manually pressed upon retracting said stylus out of said stylus holding channel.

10. The arrangement for safely keeping said stylus as defined in claim 7, wherein the radius of curvature of said stylus is greater than the radius of curvature of said hook.

11. The arrangement for safely keeping said stylus as defined in claim 7, wherein a distal end and a proximal end of said hook are rounded or beveled so as to allow for camming action as said stylus is inserted into or removed from said palm-sized computer.

12. The arrangement for safely keeping said stylus as defined in claim 7, wherein said resilient strip having said hook flexes to allow for the insertion and removal of said stylus from said palm-sized computer when said hook is not in contact with one of said grooves on said stylus.

13. A stylus holder for a palm-sized computer, comprising:
   a housing for said palm-sized computer, said housing containing an opening;
   a stylus having at least one groove, said stylus being able to fit within said opening of said housing, said stylus having a first radius of curvature and said groove having a second and smaller radius of curvature;
   a resilient strip having a distal and a proximal end, said distal end being deeper in said opening than said proximal end, said resilient strip being parallel with said opening;
   a hook disposed on said distal end of said resilient strip, said hook having said second radius of curvature that mates with said groove of said stylus over a surface of said groove of said stylus, holding said stylus inside said opening of said housing.

14. The stylus holder for a palm-sized computer of claim 13, wherein a distal end and a proximal end of said hook are rounded or beveled so as to allow for camming action as said stylus is inserted into or removed from said palm-sized computer.

15. The stylus holder for a palm-sized computer of claim 13, wherein said resilient strip having said hook flexes to allow for the insertion and removal of said stylus from said palm-sized computer when said hook is not in contact with one of said grooves on said stylus.

16. A stylus for a palm-sized computer, comprising:
   a housing for said palm-sized computer, said housing comprising an opening;
   a stylus having a groove, said stylus being able to fit within said opening of said housing, said stylus having a central axis, said stylus having a shape essentially of a cylinder, said stylus having a first radius of curvature forming a first cylindrical surface with all points equidistant from said central axis, said stylus having an annular channel having a second and smaller radius of curvature, a surface on a bottom of said channel forming a second cylindrical surface, said second cylindrical surface having all points thereon being equidistant from said central axis;
   a resilient strip having a distal and a proximal end, said distal end being deeper in said opening than said proximal end, said resilient strip being parallel with said opening; and
   a hook disposed on said distal end of said resilient strip, said hook having a third surface that has a second radius of curvature that contacts and mates with a substantial portion of said second cylindrical surface on said surface on said bottom of said channel of said stylus, holding said stylus inside said opening of said housing.

17. The apparatus of claim 16, wherein a distal end and a proximal end of said hook are beveled allowing for camming action as said stylus is inserted into or removed from said housing.

18. The apparatus of claim 16, wherein said stylus has more than one channel allowing a user to insert said stylus securely into said opening of said housing at varying degrees.

19. The apparatus of claim 16, wherein a distal end and a proximal end of said hook are rounded allowing for camming action as said stylus is inserted into or removed from said housing.

* * * * *